US006596347B2

(12) United States Patent
Emch

(10) Patent No.: US 6,596,347 B2
(45) **Date of Patent: *Jul. 22, 2003**

(54) MULTI-STAGE PROCESSES FOR COATING SUBSTRATES WITH A FIRST POWDER COATING AND A SECOND POWDER COATING

(75) Inventor: Donaldson J. Emch, Goodrich, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 49 days.

This patent is subject to a terminal disclaimer.

(21) Appl. No.: 09/969,480

(22) Filed: Oct. 2, 2001

(65) Prior Publication Data

US 2002/0071918 A1 Jun. 13, 2002

Related U.S. Application Data

(63) Continuation-in-part of application No. 09/840,573, filed on Apr. 23, 2001, which is a continuation-in-part of application No. 09/320,264, filed on May 26, 1999, now Pat. No. 6,221,441.

(51) Int. Cl.[7] ............................ B05D 3/02; B05D 3/06; B05P 1/38; C08J 7/18; B29C 71/02; B29C 71/04

(52) U.S. Cl. ....................... 427/542; 427/521; 427/189; 427/202; 427/195; 427/378; 427/379; 427/409; 427/388.1

(58) Field of Search ................................ 427/542, 384, 427/388.1, 386, 379, 378, 410, 409, 189, 202, 521, 195

(56) References Cited

U.S. PATENT DOCUMENTS

| | | | | |
|---|---|---|---|---|
| 1,998,615 | A | 4/1935 | Groven | 91/70 |
| 2,377,946 | A | 6/1945 | Leary | 18/19 |
| 2,387,516 | A | 10/1945 | Kaminski | 219/34 |
| 2,472,293 | A | 6/1949 | Groven | 34/60 |
| 2,478,001 | A | 8/1949 | Miskella | 219/35 |
| 2,498,339 | A | 2/1950 | Miseklla | 91/55 |
| 2,876,135 | A | 3/1959 | Levine | 117/76 |
| 3,151,950 | A | 10/1964 | Newman et al. | 34/4 |
| 3,455,806 | A | 7/1969 | Spoor et al. | 204/181 |
| 3,591,767 | A | 7/1971 | Mudie | 219/354 |
| 3,731,051 | A | 5/1973 | Ellersick | 219/162 |

(List continued on next page.)

FOREIGN PATENT DOCUMENTS

| | | |
|---|---|---|
| DE | 19642970 | 4/1997 |
| EP | 0038127 | 3/1981 |
| EP | 0148718 | 11/1994 |
| GB | 2091859 | 8/1982 |
| WO | WO 98/40170 | 9/1998 |

OTHER PUBLICATIONS

"Infrared Flash Oven" Brochure, BGK Automotive Group No date.

(List continued on next page.)

*Primary Examiner*—Marianne Padgett
(74) *Attorney, Agent, or Firm*—William J. Uhl

(57) ABSTRACT

Processes for coating metal or polymeric substrates are provided which include the steps of: (a) applying a first powder coating composition to a surface of the substrate; (b) applying a first infrared radiation at a power density of 30 kilowatts per meter squared or less and optionally a first air simultaneously to the first coating composition for a first period of at least about 90 seconds such that a sintered first coating is formed upon the surface of the substrate; (c) applying a second powder coating composition over the first coating; and (d) applying a second infrared radiation at a power density of 30 kilowatts per meter squared or less and a second air at an air velocity ranging from about 0.5 to about 13 meters per second simultaneously to the second coating composition for a second period of at least about 2 minutes, such that a powder layered system is formed upon the surface of the substrate.

40 Claims, 3 Drawing Sheets

U.S. PATENT DOCUMENTS

| | | | | | |
|---|---|---|---|---|---|
| 3,749,657 | A | | 7/1973 | Le Bras et al. | 204/181 |
| 3,953,643 | A | | 4/1976 | Cheung et al. | 428/220 |
| 3,953,644 | A | | 4/1976 | Camelon et al. | 428/220 |
| 3,998,716 | A | | 12/1976 | Masar et al. | 204/181 |
| 4,259,566 | A | | 3/1981 | Kobayashi | 219/222 |
| 4,265,936 | A | | 5/1981 | Prohaska, Jr. | 427/140 |
| 4,336,279 | A | | 6/1982 | Metzger | 427/55 |
| 4,349,724 | A | | 9/1982 | Ellersick | 219/347 |
| 4,389,970 | A | | 6/1983 | Edgerton | 118/666 |
| 4,390,564 | A | | 6/1983 | Kimble | 427/35 |
| 4,403,003 | A | | 9/1983 | Backhouse | 427/407.1 |
| 4,416,068 | A | | 11/1983 | Nilsson et al. | 34/4 |
| 4,423,312 | A | | 12/1983 | Wiedenfeld et al. | 219/388 |
| 4,461,094 | A | | 7/1984 | Schnalke | 34/9 |
| 4,535,548 | A | | 8/1985 | Hyde | 34/4 |
| 4,546,553 | A | | 10/1985 | Best | 34/39 |
| 4,594,266 | A | | 6/1986 | Lemaire et al. | 427/55 |
| 4,731,290 | A | | 3/1988 | Chang | 428/335 |
| 4,771,728 | A | | 9/1988 | Bergman, Jr. | 118/642 |
| 4,820,555 | A | | 4/1989 | Kuwajima et al. | 427/407.1 |
| 4,822,685 | A | | 4/1989 | Perez et al. | 428/423.3 |
| 4,891,111 | A | | 1/1990 | McCollum et al. | 204/181.7 |
| 4,894,261 | A | | 1/1990 | Gulbins et al. | 427/379 |
| 4,907,533 | A | | 3/1990 | Nelson et al. | 118/663 |
| 4,908,231 | A | | 3/1990 | Nelson et al. | 427/55 |
| 4,933,056 | A | | 6/1990 | Corrigan et al. | 204/181.7 |
| 4,943,447 | A | | 7/1990 | Nelson et al. | 427/55 |
| 4,971,837 | A | | 11/1990 | Martz et al. | 422/388.2 |
| 4,988,537 | A | | 1/1991 | Tanimoto et al. | 427/46 |
| 5,050,232 | A | | 9/1991 | Bergman et al. | 392/412 |
| 5,075,132 | A | | 12/1991 | Ogasawara | 427/55 |
| 5,137,972 | A | | 8/1992 | Cook | 525/123 |
| 5,196,485 | A | | 3/1993 | McMonigal et al. | 525/327.3 |
| 5,323,485 | A | | 6/1994 | Josefsson et al. | 392/417 |
| 5,335,308 | A | | 8/1994 | Sorensen | 392/412 |
| 5,338,578 | A | | 8/1994 | Leach | 427/470 |
| 5,340,089 | A | | 8/1994 | Heath et al. | 266/87 |
| RE34,730 | E | | 9/1994 | Salatin et al. | 427/407.1 |
| 5,401,790 | A | | 3/1995 | Poole et al. | 524/199 |
| 5,407,747 | A | | 4/1995 | Sammel et al. | 428/419 |
| 5,425,970 | A | | 6/1995 | Lahrmann et al. | 427/493 |
| 5,427,822 | A | | 6/1995 | Bracciano | 427/424 |
| 5,453,295 | A | | 9/1995 | Sammel et al. | 427/195 |
| 5,486,384 | A | | 1/1996 | Bastian et al. | 427/493 |
| 5,492,731 | A | | 2/1996 | Temple et al. | 427/407.1 |
| 5,551,670 | A | | 9/1996 | Heath et al. | 266/87 |
| 5,556,527 | A | | 9/1996 | Igarashi et al. | 204/488 |
| 5,612,095 | A | | 3/1997 | Brock et al. | 427/407.1 |
| 5,614,271 | A | | 3/1997 | Shibuya et al. | 427/541 |
| 5,635,302 | A | | 6/1997 | Budde et al. | 528/461 |
| 5,654,037 | A | | 8/1997 | Moore et al. | 427/379 |
| 5,698,310 | A | | 12/1997 | Nakamura et al. | 428/328 |
| 5,709,909 | A | | 1/1998 | Leibfarth et al. | 427/407.1 |
| 5,716,678 | A | | 2/1998 | Rockrath et al. | 427/407.1 |
| 5,760,107 | A | | 6/1998 | Valko et al. | 523/404 |
| 5,820,933 | A | | 10/1998 | Carroll | 427/314 |
| 5,820,987 | A | | 10/1998 | Kaufman et al. | 428/413 |
| 5,863,613 | A | * | 1/1999 | Emch | 427/422 |
| 5,871,809 | A | | 2/1999 | Liedtke et al. | 427/140 |
| 5,888,592 | A | | 3/1999 | Biallas et al. | 427/542 |
| 5,980,993 | A | * | 11/1999 | Mauer et al. | 427/410 |
| 6,113,764 | A | * | 9/2000 | Emch | 204/509 |
| 6,200,650 | B1 | * | 3/2001 | Emch | 427/542 |
| 6,221,441 | B1 | * | 4/2001 | Emch | 427/542 |
| 6,231,932 | B1 | * | 5/2001 | Emch | 427/542 |
| 6,291,027 | B1 | * | 9/2001 | Emch | 427/542 |

OTHER PUBLICATIONS

"Heated Flash Technical Specifications", General Motors NAO Paint General Technical Specifications Document No. 34909 (Jan. 14, 1997).

"Specifications for Heated Flash Off for Water–Borne Basecoat Application", Ford Motor Co. Body and Assembly Operations Sec. 240 (Jan. 15, 1995).

"The Proof Is In The Heating", Industrial Energy Efficieny Centre, U.K., HQ41D (Apr. 25, 1995).

R. Hampshire "The Use of Radiant Heat Transfer in the Curing of Coatings on Complex Geometrics and Problematic Substrates", Interfinish 1996 World Congress, Birmingham, UK (Sep. 1996).

W. Veenstra et al., "IRK Halogen Infrared Radiators in the Industrial Heating Process", Philips Lighting, Einhoven, Netherlands.

"Powder Coatings", Blasdel Equipment Infrared ovens http://blasdelent.com/powder.html Mar. 12, 1999.

"Gas Infrared Ovens", Thermovation Engineering Inc. http://www.thomasregister.com/olc/thermovation/gas.htm Mar. 12, 1999.

"Combination Ovens for Curing of Powder Coatings", IUT no date.

* cited by examiner

MULTI-STAGE PROCESSES FOR COATING SUBSTRATES WITH A FIRST POWDER COATING AND A SECOND POWDER COATING

CROSS-REFERENCE TO RELATED APPLICATIONS

This application is a continuation-in-part of co-pending U.S. patent application Ser. No. 09/840,573, filed Apr. 23, 2001, entitled "Multi-Stage Processes for Coating Substrates with Liquid Basecoat and Powder Topcoat", which is a continuation-in-part of U.S. patent application Ser. No. 09/320,264, filed May 26, 1999 entitled "Multi-Stage Processes for Coating Substrates with Liquid Basecoat and Powder Topcoat", now U.S. Pat. No. 6,221,441. This patent application is also related to U.S. patent application Ser. No. 09/320,265 entitled "Multi-Stage Processes for Coating Substrates with Liquid Basecoat and Liquid Topcoat", now U.S. Pat. No. 6,291,027; U.S. patent application Ser. No. 09/320,483 entitled "Processes for Coating a Metal Substrate with an Electrodeposited Coating Composition and Drying the Same", now U.S. Pat. No. 6,113,764; U.S. patent application Ser. No. 09/320,484 entitled "Processes For Drying and Curing Primer Coating Compositions", now U.S. Pat. No. 6,200,650; and U.S. patent application Ser. No. 09/320,522 entitled "Processes For Drying Topcoats And Multicomponent Composite Coatings On Metal And Polymeric Substrates", now U.S. Pat. No. 6,231,932, all of Donaldson J. Emch. Each of the aforementioned patents and applications are incorporated by reference herein.

FIELD OF THE INVENTION

The present invention relates to substrate coating applications and, more particularly, to multi-stage processes for coating a substrate with a first powder coating and a subsequent second powder coating, and the application of a combination of infrared radiation and convection treatment to at least one of the powder coatings.

BACKGROUND OF THE INVENTION

Today's automobile bodies are treated with multiple layers of coatings which not only enhance the appearance of the automobile, but also provide protection from corrosion, chipping, ultraviolet light, acid rain and other environmental conditions which can deteriorate the coating appearance and underlying car body.

The formulations of these coatings can vary widely. However, a major challenge that faces all automotive manufacturers is how to rapidly treat and cure these coatings with minimal capital investment and floor space, which is valued at a premium in manufacturing plants.

Various ideas have been proposed to speed up treating and curing processes for automobile coatings such as hot air convection treatment. While hot air treatment is rapid, a skin can form on the surface of the coating which impedes the escape of volatiles and entrapped air from the coating composition and causes pops, bubbles or blisters which ruin the appearance of the dried coating, and can mar or dislodge portions of the applied powder coating.

Other methods and apparatus for treating and curing a coating applied to an automobile body are disclosed in U.S. Pat. Nos. 4,771,728; 4,907,533; 4,908,231 and 4,943,447 in which the automobile body is heated with radiant heat for a time sufficient to set the coating on Class A surfaces of the body and subsequently cured with heated air.

U.S. Pat. No. 4,416,068 discloses a method and apparatus for accelerating the treating and curing of refinish coatings for automobiles using infrared radiation. Ventilation air used to protect the infrared radiators from solvent vapors is discharged as a laminar flow over the car body. FIG. 15 is a graph of temperature as a function of time showing the preferred high temperature/short treatment time curve 122 versus conventional infrared treatment (curve 113) and convection treatment (curve 114). Such rapid, high temperature treatment techniques can be undesirable because a skin can form on the surface of the coating that can cause surface defects, as discussed above. In the case of powder coating, the coating can "set" too quickly before adequate flow is achieved after melting. Melt viscosity and cure rate must be balanced to achieve optimum flow.

U.S. Pat. No. 4,336,279 discloses a process and apparatus for treating automobile coatings using direct radiant energy, a majority of which has a wavelength greater than 5 microns. Heated air is circulated under turbulent conditions against the back sides of the walls of the heating chamber to provide the radiant heat. Then, the heated air is circulated as a generally laminar flow along the inner sides of the walls to maintain the temperature of the walls and remove volatiles from the treatment chamber.

As discussed at column 7, lines 18–22, air movement is maintained at a minimum in the central portion of the inner chamber in which the automobile body is dried.

A rapid, multi-stage treatment process for automobile coatings is needed which inhibits formation of surface defects and discoloration in the coating, particularly for use with a first powder coating composition to be overcoated with a second powder coating composition.

SUMMARY OF THE INVENTION

The present invention provides a process for coating a metal substrate, comprising the steps of: (a) applying a powder first coating composition to a surface of the metal substrate; (b) applying a first infrared radiation at a power density of 30 kilowatts per meter squared or less and optionally a first air simultaneously to the first coating composition for a first period of at least about 90 seconds, a first temperature of the metal substrate being increased at a first rate ranging from about 0.3° C. per second to about 1.25° C. per second to achieve a first peak metal temperature ranging from about 125° C. to about 200° C., such that a sintered first coating is formed upon the surface of the metal substrate; (c) applying a second powder coating composition over the first coating; and (d) applying a second infrared radiation at a power density of 30 kilowatts per meter squared or less and a second air simultaneously to the second coating composition for a second period of at least about 2 minutes, a second temperature of the metal substrate being increased at a second rate ranging from about 0.8° C. per second to about 1.3° C. per second to achieve a second peak metal temperature of the substrate ranging from about 125° C. to about 175° C., such that a powder layered system is formed upon the surface of the metal substrate.

Another aspect of the present invention is a process for coating a substrate, comprising the steps of: (a) applying a first powder coating composition to a surface of the substrate; (b) applying a first infrared radiation at a power density of 30 kilowatts per meter squared or less and optionally a first air simultaneously to the first coating composition for a first period of at least about 90 seconds such that a sintered first coating is formed upon the surface of the substrate; (c) applying a second powder coating composition over the first coating; and (d) applying a second infrared radiation at a power density of 30 kilowatts per meter squared or less and a second air at an air velocity ranging from about 0.5 to about 13 meters per second simultaneously to the first coating composition for a second period of at least about 2 minutes, such that a powder layered system is formed upon the surface of the substrate.

Yet another aspect of the present invention is a process for coating a polymeric substrate, comprising the steps of: (a) applying a first powder coating composition to a surface of the polymeric substrate; (b) applying a first infrared radiation at a power density of 30 kilowatts per meter squared or less and optionally a first air simultaneously to the first coating composition for a first period of at least about 90 seconds, a first temperature of the polymeric substrate being increased at a first rate ranging from about 0.30° C. per second to about 1.25° C. per second to achieve a first peak polymeric temperature ranging from about 125° C. to about 200° C., such that a sintered first coating is formed upon the surface of the polymeric substrate; (c) applying a second powder coating composition over the first coating; and (d) applying a second infrared radiation and a second air simultaneously to the second coating composition for a second period of at least about 2 minutes, a second temperature of the polymeric substrate being increased at a second rate ranging from about 0.80° C. per second to about 1.3° C. per second to achieve a second peak polymeric temperature of the substrate ranging from about 90° C. to about 175° C., such that a powder layered system is formed upon the surface of the polymeric substrate.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

Other than in the operating examples, or unless otherwise expressly specified, all of the numerical ranges, amounts, values and percentages such as those for amounts of materials, times and temperatures of reaction, ratios of amounts, and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

Figure 1:
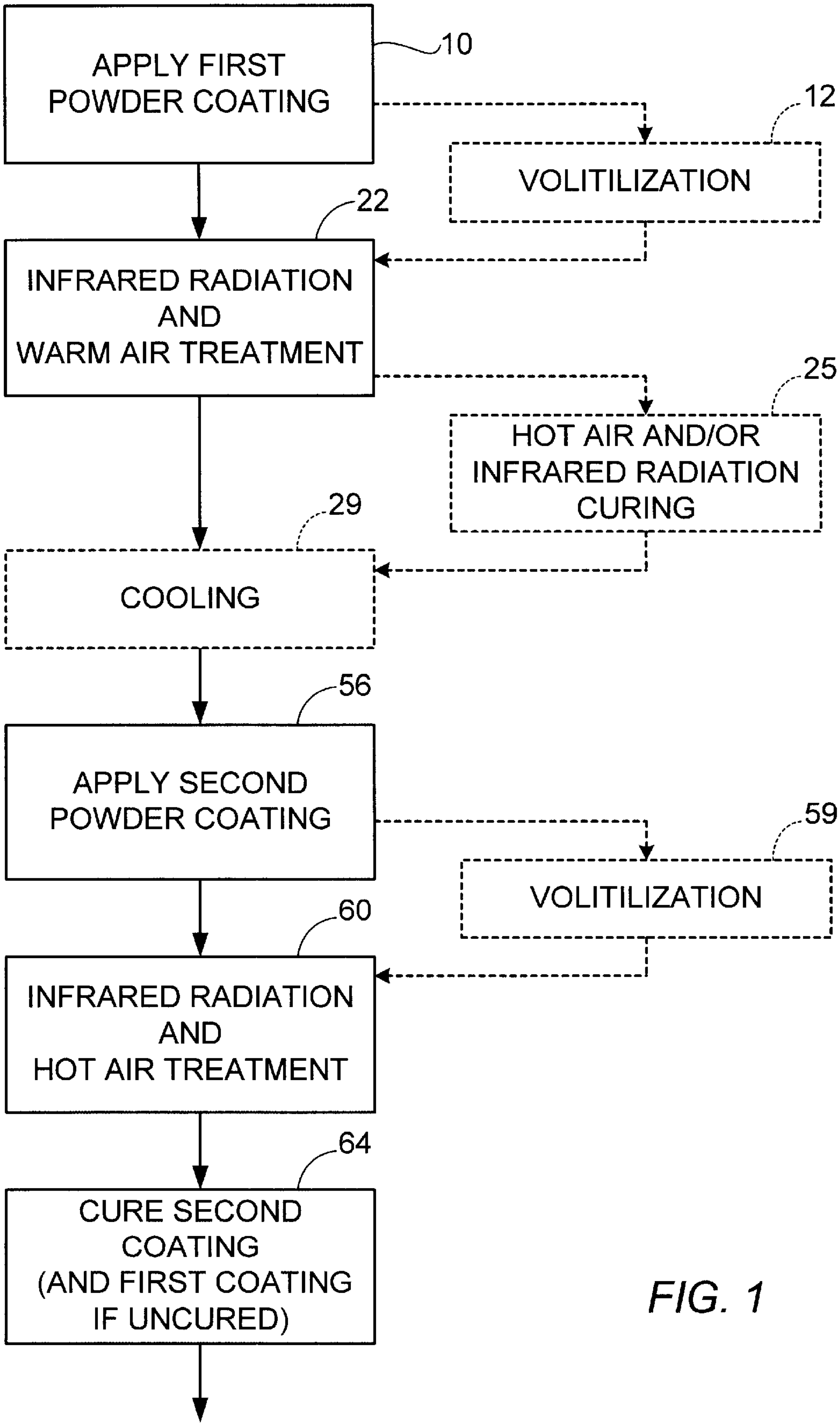
FIG. 1 is a flow diagram of a process for treating powder basecoat and powder topcoat according to the present invention.

Referring to the drawings, in which like numerals indicate like elements throughout, there is shown in FIG. 1 a flow diagram of a multi-stage process for coating a substrate according to the present invention.

This process is suitable for coating metal or polymeric substrates in a batch or continuous process. In a batch process, the substrate is stationary during each treatment step of the process, whereas in a continuous process the substrate is in continuous movement along an assembly line. The present invention will now be discussed generally in the context of coating a substrate in a continuous assembly line process, although the process also is useful for coating substrates in a batch process.

Useful substrates that can be coated according to the process of the present invention include metal substrates, polymeric substrates, such as thermoset materials and thermoplastic materials, and combinations thereof.

Useful metal substrates that can be coated according to the process of the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, ethylene propylene diene monomer (EPDM) rubber, copolymers and mixtures thereof.

Preferably, the substrates are used as components to fabricate automotive vehicles, including but not limited to automobiles, trucks and tractors. The substrates can have any shape, but are preferably in the form of automotive body components such as bodies (frames), hoods, doors, fenders, bumpers and/or trim for automotive vehicles.

The present invention first will be discussed generally in the context of coating a metallic automobile body. One skilled in the art would understand that the process of the present invention also is useful for coating non-automotive metal and/or polymeric components, which will be discussed below.

In addition, the present invention will be discussed generally in the context of coating an automobile body with a powder basecoating composition and a powder topcoating composition. Although the process of the present invention provides particularly good results when applied to the basecoating/topcoating powder system, one skilled in the art, reading the present specification, would understand that the process of the present invention also is useful for various other multi-coating powder systems such as primer/clearcoating powder systems, basecoating/basecoating powder systems, clearcoating/clearcoating powder systems, and the like.

Prior to treatment according to the process of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate. An example of suitable BONAZINC compositions are described in published International Application WO 00/32351, which is incorporated herein by reference. Alternatively or additionally, an electrodepositable coating composition can be electrodeposited upon at least a portion of the metal substrate. Useful electrodeposition methods and electrodepositable coating compositions include conventional anionic or cationic electrodepositable coating compositions, such as epoxy or polyurethane-based coatings discussed in U.S. Pat. Nos. 6,217,674, 5,530,043; 5,760,107; 5,820,987 and 4,933,056, which are incorporated herein by reference.

Referring now to FIG. 1, which presents a flow chart of the process of the present invention, a powder basecoating composition (i.e. a first powder coating) is applied to a surface of the metal substrate (automobile body 16) in a first step 10, preferably over an electrodeposited coating as described above. As used herein, a "powder" basecoating composition is meant to include basecoating compositions comprising dry powders and powders that are slurried in a solution, such as water. Suitable powder slurry basecoating compositions include those disclosed in U.S. Pat. Nos. 4,122,055 and 4,476,271, which are incorporated by reference herein. It is contemplated that the basecoating composition may include more than one applied layer of the same or different basecoating compositions prior to being treated by the process of the present invention, as described in more detail below in Example 1. The powder basecoating can be applied to the surface of the substrate in step 10 by any suitable coating process well known to those skilled in the art, for example, by electrostatic spraying using a gun or bell at 55 to 80 kV, 80 to 120 grams per minute to achieve a film thickness of about 10–38 microns. The method and apparatus for applying the powder basecoating composition to the substrate is determined in part by the configuration and type of substrate material.

The powder basecoating composition comprises a film-forming material or binder, optionally a volatile material when, for example, the powder coating is slurried in an aqueous solution, and optionally a pigment. Preferably, the basecoating composition is a crosslinkable coating composition comprising at least one thermosettable film-forming material, such as acrylics, polyesters (including alkyds), polyurethanes and epoxies, and at least one crosslinking material. Thermoplastic film-forming materials such as polyolefins also can be used. The amount of film-forming material in the basecoating composition generally ranges from about 50 to about 97 weight percent on a basis of total weight solids of the basecoating composition.

Suitable acrylic polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate, optionally together with one or more other polymerizable ethylenically unsaturated monomers including vinyl aromatic compounds such as styrene and vinyl toluene, nitriles such as acrylonitrile and methacrylonitrile, vinyl and vinylidene halides, and vinyl esters such as vinyl acetate. Other suitable acrylics and methods for preparing the same are disclosed in U.S. Pat. No. 5,196,485 at column 11, lines 16–60, which are incorporated herein by reference.

Polyesters and alkyds are other examples of resinous binders useful for preparing the basecoating composition. Such polymers can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids such as adipic acid, maleic acid, fumaric acid, phthalic acids, trimellitic acid or drying oil fatty acids.

Polyurethanes also can be used as the resinous binder of the basecoat. Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

Suitable crosslinking materials include aminoplasts, polyisocyanates, polyacids, polyanhydrides and mixtures thereof. Useful aminoplast resins are based on the addition products of formaldehyde, with an amino- or amido-group carrying substance. Condensation products obtained from the reaction of alcohols and formaldehyde with melamine, urea or benzoguanamine are most common. Useful polyisocyanate crosslinking materials include blocked or unblocked polyisocyanates such as those discussed above for preparing the polyurethane. Examples of suitable blocking agents for the polyisocyanates include lower aliphatic alcohols such as methanol, oximes such as methyl ethyl ketoxime and lactams such as caprolactam. The amount of the crosslinking material in the basecoat coating composition generally ranges from about 3 to about 50 weight percent on a basis of total resin solids weight of the basecoat coating composition.

The powder basecoating composition may comprise one or more volatile materials such as water, organic solvents and/or amines if, for example, the basecoating composition is a slurried composition. Nonlimiting examples of useful solvents included in the composition, in addition to any provided by other coating components, include aliphatic solvents such as hexane, naphtha, and mineral spirits; aromatic and/or alkylated aromatic solvents such as toluene, xylene, and SOLVESSO 100, commercially available from Imperial Oil, Toronto, Canada; alcohols such as ethyl, methyl, n-propyl, isopropyl, n-butyl, isobutyl and amyl alcohol, and m-pyrol; esters such as ethyl acetate, n-butyl acetate, isobutyl acetate and isobutyl isobutyrate; ketones such as acetone, methyl ethyl ketone, methyl isobutyl ketone, diisobutyl ketone, methyl n-amyl ketone, and isophorone, glycol ethers and glycol ether esters such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate. Useful amines include alkanolamines. The slurry basecoating composition may have a solids content generally ranging from about 30 to about 50 weight percent, an organic solvent content of up to about 10 percent by weight, and may have dispersant content of up to about 5 percent by weight.

The basecoating composition can further comprise one or more pigments or other additives such as UV absorbers, rheology control agents or surfactants. Useful metallic pigments include aluminum flake, bronze flakes, coated mica, nickel flakes, tin flakes, silver flakes, copper flakes and combinations thereof. Other suitable pigments include mica, iron oxides, lead oxides, carbon black, titanium dioxide and colored organic pigments such as phthalocyanines. The specific pigment to binder ratio can vary widely so long as it provides the requisite hiding at the desired film thickness and application solids.

Suitable basecoats for use in the present invention include, for example, those disclosed in U.S. Pat. Nos. 4,801,680 and 4,889,890, which are incorporated by reference herein.

The thickness of the basecoating composition applied to the substrate can vary based upon such factors as the type of substrate and intended use of the substrate, i.e., the environment in which the substrate is to be placed and the nature of the contacting materials. Generally, the thickness of the basecoating composition applied to the substrate ranges from about 10 to about 100 micrometers, and more preferably about 38 to about 63 micrometers.

Referring now to FIG. 1, after applying the basecoat composition, the process of the present invention may include a second step 12 of exposing the basecoating composition to low velocity air having a temperature ranging from about 10° C. to about 50° C., and preferably about 20° C. to about 40° C., for a period of at least about 5 minutes (preferably about 5 to about 10 minutes) to volatilize at least a portion of the volatile material from the basecoating composition and set the basecoat. This step is primarily related to treatment of powder basecoating compositions that are slurried in solution, such as water.

As used herein, the term "set" means that the basecoat is tack-free (resists adherence of dust and other airborne contaminants) and is not disturbed or marred (waved or rippled) by air currents which blow past the basecoated surface. The velocity of the air at a surface of the basecoating composition is less than about 0.5 meters per second, and preferably ranges from about 0.3 to about 0.5 meters per second. As used herein, the phrase "about (some number) or less" or "less than about (some number)" is meant to be a range wherein the low end of the range is greater than 0.

Figure 2:
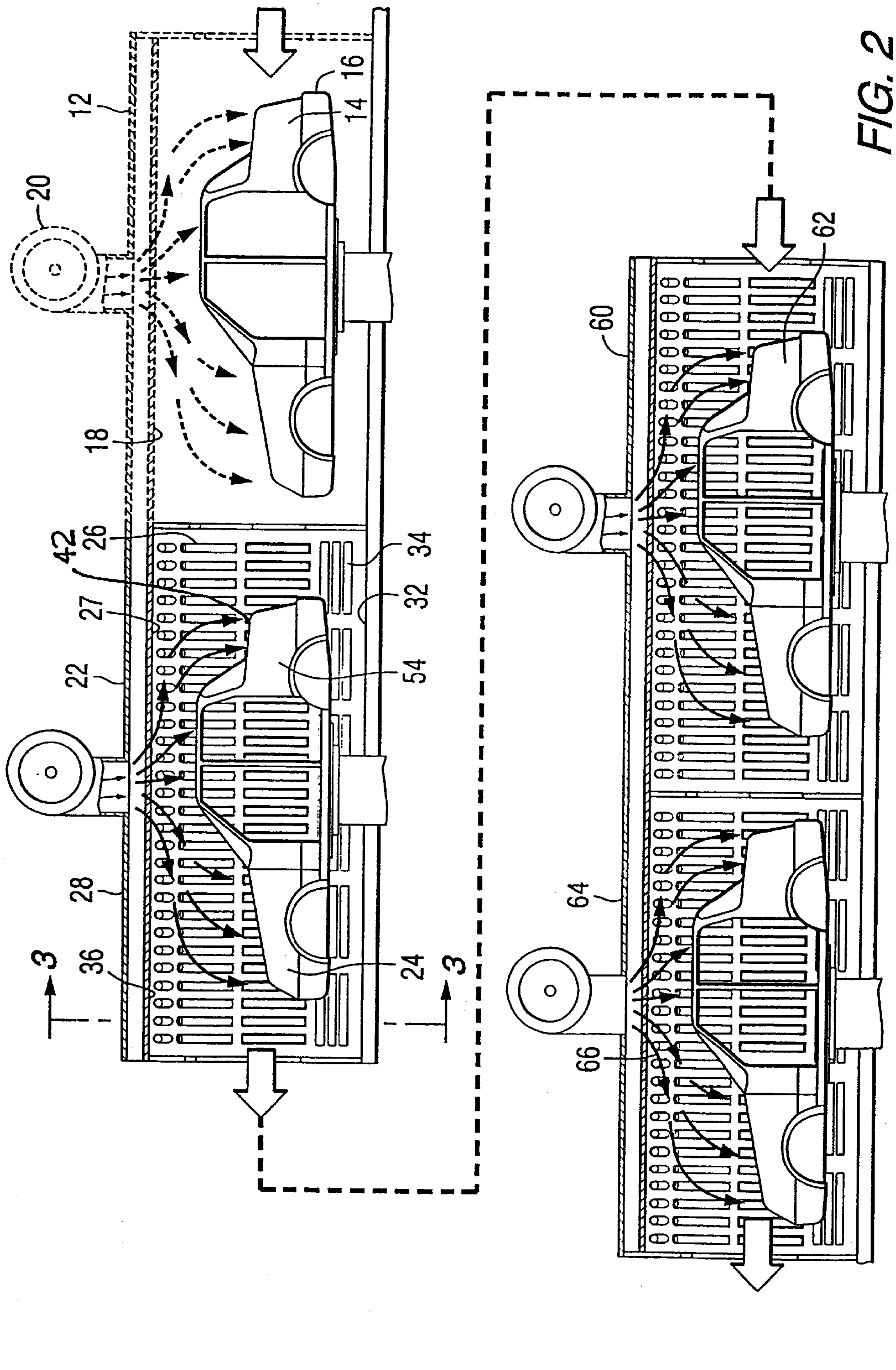
FIG. 2 is a side elevational schematic diagram of a portion of the process of FIG. 1.

The volatilization or evaporation of volatile components from the basecoat surface can be carried out in the open air, but is preferably carried out in a first treatment chamber 18 in which air is circulated at low velocity to minimize airborne particle contamination as shown in FIG. 2. The automobile body 16 is positioned at the entrance to the first treatment chamber 18 and slowly moved therethrough in assembly-line manner at a rate which permits the volatilization of the basecoat as discussed above. The rate at which the automobile body 16 is moved through the first treatment chamber 18 and the other treatment chambers discussed below depends in part upon the length and configuration of the treatment chamber 18, but preferably ranges from about 3 meters per minute to about 7.3 meters per minute for a continuous process. One skilled in the art would understand that individual dryers can be used for each step of the process or that a single dryer having a plurality of individual treatment chambers or sections (shown in FIG. 2) configured to correspond to each step of the process can be used, as desired.

The air preferably is supplied to the first treatment chamber 18 by a blower 20 or dryer, shown in phantom in FIG. 2. A non-limiting example of a suitable blower is an ALTIVAR 66 blower that is commercially available from Square D Corporation. The air can be circulated at ambient temperature or heated, if necessary, to the desired temperature range of about 10° C. to about 50° C. Preferably, the basecoating composition is exposed to air for a period ranging from about 5 to about 10 minutes before the automobile body 16 is moved to the next stage of the treatment process.

Referring now to FIGS. 1 and 2, the process further comprises an additional step 22 (which can be used after step 12 above or in lieu thereof of applying infrared radiation and, optionally, low velocity warm air simultaneously to the basecoating composition for a period of at least about 90 seconds, and up to about 480 seconds, such that the temperature of the metal substrate is increased at a rate ranging from about 0.3° C. per second to about 1.25° C. per second to achieve a peak metal temperature ranging from about 125° C. to about 200° C. and form a sintered basecoat upon the surface of the metal substrate. By controlling the rate at which the metal temperature is increased and peak metal temperature, flaws in the appearance of the basecoat and topcoat can be minimized.

As used herein, the term "sintered" means that the powder basecoat is melted, fused, and caused to form a continuous film, such that some crosslinking may occur, but not to the extent that the basecoat is cured. As used herein, "cure" means that any crosslinkable components of the coating are substantially crosslinked.

The infrared radiation applied preferably includes near-infrared region (0.7 to 1.5 micrometers) and intermediate-infrared region (1.5 to 20 micrometers) radiation, and more preferably ranges from about 0.7 to about 4 micrometers. The infrared radiation heats the Class A (external) surfaces 24 of the coated substrate which are exposed to the radiation and preferably induces sintering of the basecoating composition. Most non-Class A surfaces are not exposed directly to the infrared radiation but will be heated through conduction through the automobile body and random scattering of the infrared radiation, as well as from air convection.

Figure 3:
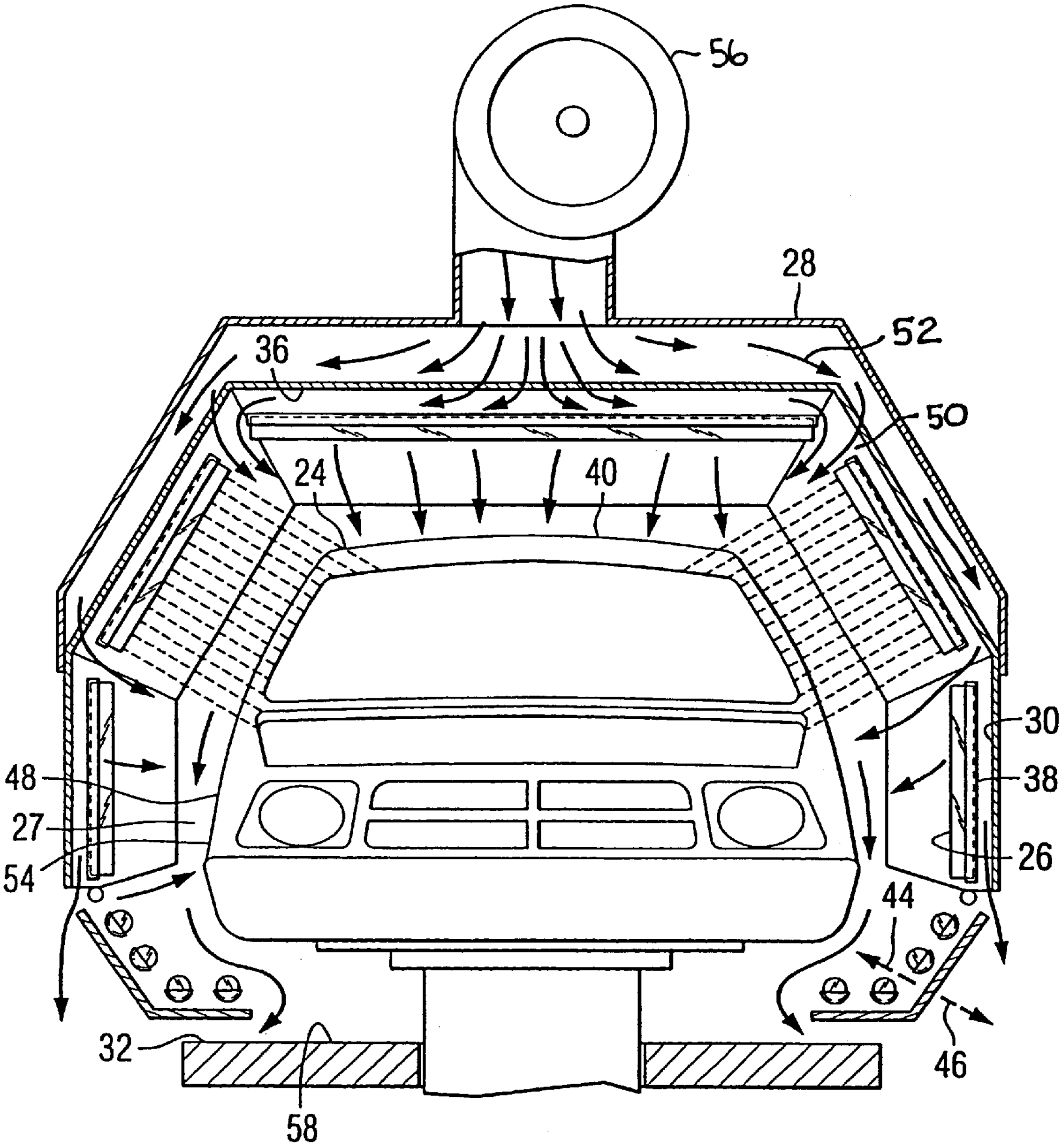
FIG. 3 is a front elevational view taken along line 3-3 of a portion of the schematic diagram of FIG. 2.

Referring now to FIGS. 2 and 3, the infrared radiation is emitted by a plurality of emitters 26 arranged in the interior treatment chamber 27 of a combination infrared/convection treating apparatus 28. Each emitter 26 is preferably a high intensity infrared lamp, preferably a quartz envelope lamp having a tungsten filament. Useful short wavelength (0.76 to 2 micrometers), high intensity lamps include Model No. T-3 lamps such as are commercially available from General Electric Co., Sylvania, Phillips, Heraeus and Ushio and have an emission rate of between 75 and 100 watts per lineal inch at the light source. Medium wavelength (2 to 4 micrometers) lamps also can be used and are available from the same suppliers. The emitter lamp is preferably generally rod-shaped and has a length that can be varied to suit the configuration of the oven, but generally is preferably about 0.75 to about 1.5 meters long. Each medium wavelength emitter is preferably a medium intensity infrared lamp, preferably a quartz envelope lamp having a carbon filter filament. Preferably, the emitter lamps on the side walls 30 of the interior treatment chamber 27 are arranged generally vertically with reference to ground 32, except for a few rows 34 (preferably about 3 to about 5 rows) of emitters 26 at the bottom of the interior treatment chamber 27 which are arranged generally horizontally to ground 32.

The number of emitters 26 can vary depending upon the desired intensity of energy to be emitted. In a preferred embodiment, the number of emitters 26 mounted to the ceiling 36 of the interior treatment chamber 27 is about 24 to about 32 arranged in a linear side-by side array with the emitters 26 spaced about 10 to about 20 centimeters apart from center to center, and preferably about 15 centimeters. The width of the interior treatment chamber 27 is sufficient to accommodate the automobile body or whatever substrate component is to be sintered therein, and preferably is about 2.5 to about 3.0 meters wide. Preferably, each side wall 30 of the chamber 27 has about 50 to about 60 lamps with the lamps spaced about 15 to about 20 centimeters apart from center to center. The length of each side wall 30 is sufficient to encompass the length of the automobile body or whatever substrate component is being sintered therein, and preferably is about 4 to about 6 meters. The side wall 30 preferably has four horizontal sections that are angled to conform to the shape of the sides of the automobile body. The top section of the side wall 30 preferably has 24 parallel lamps divided into 6 zones. In one embodiment, the three zones nearest the entrance to the treatment chamber 27 are operated at medium wavelengths, the three nearest the exit at short wavelengths. The middle section of the side wall is configured similarly to the top section. The two lower sections of the side walls each preferably contain 6 bulbs in a 2 by 3 array. The first section of bulbs nearest the entrance is preferably operated at medium wavelength and the other two sections at short wavelengths.

Referring to FIG. 2, each of the emitter lamps 26 may be disposed within a trough-shaped reflector 38 that is preferably formed from polished aluminum. Suitable reflectors include aluminum or integral gold-sheathed reflectors that are commercially available from BGK-ITW Automotive, Heraeus and Fannon Products. The reflectors 38 gather energy transmitted from the emitter lamps 26 and focus the energy on the automobile body 16 to lessen energy scattering.

Depending upon such factors as the configuration and positioning of the automobile body 16 within the interior treatment chamber 27 and the color of the basecoat to be sintered, the emitter lamps 26 can be independently controlled by microprocessor (not shown) such that the emitter lamps 26 furthest from a Class A surface 24 can be illuminated at a greater intensity than lamps closest to a Class A surface 24 to provide uniform heating. For example, as the roof 40 of the automobile body 16 passes beneath a section of emitter lamps 26, the emitter lamps 26 in that zone can be adjusted to a lower intensity until the roof 40 has passed, then the intensity can be increased to heat the deck lid 42 which is at a greater distance from the emitter lamps 26 than the roof 40.

Also, in order to minimize the distance from the emitter lamps 26 to the Class A surfaces 24, the position of the side walls 30 and emitter lamps 26 can be adjusted toward or away from the automobile body as indicated by directional arrows 44, 46, respectively, in FIG. 3. One skilled in the art would understand that the closer the emitter lamps 26 are to the Class A surfaces 24 of the automobile body 16, the greater the percentage of available energy which is applied to heat the surfaces 24 and coatings present thereon. Generally, the infrared radiation is emitted at a power density ranging from about 30 kilowatts per square meter ($kW/m^2$) of emitter wall surface or less, and preferably about 12 $kW/m^2$ for emitter lamps 26 facing the sides 48 of the automobile body 16 (doors or fenders) which are closer than the emitter lamps 26 facing the hood and deck lid 42 of the automobile body 16, which preferably emit about 24 $kW/m^2$. In one embodiment, the infrared radiation is emitted in an infrared zone at a power density of less than about 30 $kW/m^2$, preferably about 4.5 $kW/m^2$ to about 14 $kW/m^2$ using Model T-3 lamps, and more preferably about 8.5 $kW/m^2$ using Heraeus medium wavelength carbon fiber filament lamps.

A non-limiting example of a suitable combination infrared/convection treating apparatus is a BGK combined infrared radiation and heated air convection oven, which is commercially available from BGK Automotive Group of Minneapolis, Minn. The general configuration of this oven will be described below and is disclosed in U.S. Pat. Nos. 4,771,728; 4,907,533; 4,908,231; and 4,943,447, which are hereby incorporated by reference. Other useful combination infrared/convection treatment apparatus are commercially available from Durr of Wixom, Mich., Thermal Innovations of Manasquan, N.J., Thermovation Engineering of Cleveland, Ohio, Dry-Quick of Greenburg, Ind. and Wisconsin Oven and Infrared Systems of East Troy, Wis.

Referring now to FIGS. 2 and 3, the preferred combination infrared/convection treatment apparatus 28 includes baffled side walls 30 having nozzles or slot openings 50 through which air 52 is passed to enter the interior treatment chamber 27. During this step, the velocity of the air (when employed) at the surface 54 of the basecoating composition preferably ranges from about 0.25 to about 1.0 meters per second.

The temperature of the air 52 generally ranges from about 65° C. to about 140° C. The air 52 is supplied by a blower 56 or dryer and can be preheated externally or by passing the air over the heated infrared emitter lamps 26 and their reflectors 38. By passing the air 52 over the emitters 26 and reflectors 38, the working temperature of these parts can be decreased, thereby extending their useful life. Also, undesirable vapors can be removed from the interior treatment chamber 27. The air 52 can also be circulated up through the interior treatment chamber 27 via the subfloor 58. Preferably, the air flow is recirculated to increase efficiency. A portion of the air flow can be bled off to remove contaminants and supplemented with filtered fresh air to make up for any losses.

The automobile body 16 is heated by the infrared radiation and warm air to a peak metal temperature ranging from about 125° C. to about 200° C. As used herein, "peak metal temperature" means the target instantaneous temperature to which the metal substrate (automobile body 16) must be heated. The peak metal temperature for a metal substrate is measured at the surface of the coated substrate approximately in the middle of the side of the substrate opposite the side on which the coating is applied. The peak temperature for a polymeric substrate is measured at the surface of the coated substrate approximately in the middle of the side of the substrate on which the coating is applied. It is preferred that this peak metal temperature be maintained for as short a time as possible to sinter the powder basecoat but to minimize the amount of crosslinking of the basecoat.

Referring again to FIG. 1, the process of the present invention can further comprise a cooling step 29 in which the temperature of the automobile body 16 having the sintered basecoat thereon from steps 22, and optionally 25, is cooled, preferably to a temperature ranging from about 25° C. to about 32° C. Cooling the basecoated automobile body 16 can facilitate application of the powder topcoat by reducing hot air eddy currents which can disturb even deposition of the powder. The basecoated automobile body 16 can be cooled in air at a temperature ranging from about 15° C. to about 25° C., and preferably about 15° C. to about 20° C. for a period ranging from about 3 to about 6 minutes. Alternatively or additionally, the basecoated automobile body 16 can be cooled by exposure to chilled, saturated air blown onto the surface of the substrate at about 4 to about 10 meters per second to prevent cracking of the coating.

After the basecoating on the automobile body 16 has been sintered (or cured (described below) and/or cooled, if desired), a powder topcoating composition (i.e. a second powder coating) is applied over the basecoat in a powder topcoating step 56. As used herein, a "powder" topcoating composition is meant to include topcoating compositions comprising dry powders and powders that are slurried in a solution, such as water. It is contemplated that the topcoating composition may include more than one applied layer of the same or different topcoating compositions prior to being treated by the process of the present invention. Suitable powder slurry topcoating compositions include those disclosed in International Publications WO 96/32452 and 96/37561, European Patents 652264 and 714958, and Canadian Pat. No. 2,163,831, which are incorporated by reference herein. The powder topcoat can be applied by electrostatic spraying using a gun or bell at 55 to 80 kV, 80 to 120 grams per minute to achieve a film thickness of about 50–90 microns, for example.

Preferably the powder topcoating composition is a crosslinkable coating comprising at least one thermosettable film-forming material and at least one crosslinking material such as are described above. The topcoating composition can include additives such as are discussed above, but generally not pigments. Suitable powder topcoats are described in U.S. Pat. Nos. 5,407,707 and 5,663,240 (incorporated by reference herein) and include epoxy functional acrylic copolymers and polycarboxylic acid crosslinking agents. The amount of the topcoating composition applied to the substrate can vary based upon such factors as the type of substrate and intended use of the substrate, i.e., the environment in which the substrate is to be placed and the nature of the contacting materials.

After applying the topcoat, the process of the present invention may include a step 59 of exposing the topcoating composition to low velocity air having a temperature ranging from about 10° C. to about 50° C., and preferably about 20° C. to about 40° C., for a period of at least about 5 minutes (preferably about 5 to about 10 minutes) to volatilize at least a portion of the volatile material from the topcoating composition and set the topcoat. This step is primarily related to treatment of powder topcoating compositions that are slurried in solution, such as water.

Referring now to FIGS. 1 and 2, the process of the present invention comprises a next step 60 of applying infrared radiation and hot air simultaneously to the topcoating composition on the metal substrate (automobile body 16) for a period of at least about 2 minutes, and preferably ranging from about 2 minutes to about 20 minutes. The temperature of the metal substrate is increased at a rate ranging from about 0.8° C. per second to about 1.3° C. per second to achieve a peak metal temperature of the substrate ranging from about 125° C. to about 175° C. A two-layered powdered system 62 is formed thereby upon the surface of the metal substrate.

By controlling the rate at which the metal temperature is increased and peak metal temperature, the combination of steps 22 and 60 can provide powder basecoat and powder topcoat composite coatings with a minimum of flaws in surface appearance. Also, high film builds can be achieved in a short period of time with minimum energy input and the flexible operating conditions can decrease the need for spot repairs. The sintered basecoat that is formed upon the surface of the automobile body 16 is treated sufficiently to enable application of the topcoat such that the quality of the topcoat will not be affected adversely by further curing of the basecoat.

Treatment step 60 can be carried out in a similar manner to that of step 22 above using a combination infrared radiation/convection treatment apparatus, however the heating time ranges from about 2 minutes to about 20 minutes, with a temperature of the metal substrate being increased at a rate ranging from about 0.8° C. per second to about 1.3° C. per second to achieve a peak metal temperature ranging from about 125° C. to about 175° C. The dwell time, and hence the length of the oven, at this stage is primarily determined by the complexity of the substrate geometry being cured. For automobile bodies with significant shutface surface (i.e. the areas, such as the door jams, that are not substantially exposed to treatment), the dwell times typically will be longer and nearer to the upper limit of treatment times than for exterior surface treatments only.

The infrared radiation applied preferably includes near-infrared region (0.7 to 1.5 micrometers) and intermediate-infrared region (1.5 to 20 micrometers) radiation, and more preferably ranges from about 0.7 to about 4 micrometers.

The hot air preferably has a temperature ranging from about 90° C. to about 200° C., and preferably ranging from about 120° C. to about 150° C. The velocity of the air at the surface of the topcoating composition in treatment step 60 preferably ranges from about 0.5 meters per second up to about 13 meters per second.

Treatment step 60 can be carried out using any conventional combination infrared/convection treatment apparatus such as the BGK combined infrared radiation and heated air convection oven which is described in detail above. The individual emitters 26 can be configured as discussed above and controlled individually or in groups by a microprocessor (not shown) to provide the desired heating and infrared energy transmission rates.

During treatment step 60, the velocity of the air at the surface of the topcoating composition preferably ranges from about 0.5 meters per second to about 13 meters per second. In a preferred embodiment, the velocity of air is applied to the surface of the topcoating composition relative to the position of the automobile body within the oven. For example, in one embodiment of the present invention, it is beneficial for the velocity of the air at the surface of the topcoating composition to be maintained at about 0.5 meters per second through a first portion of the oven, and then ramped up from about 0.5 meters per second to about 13 meters per second through a second portion of the oven. In this embodiment, the first portion and the second portion of the oven are each approximately one half of the oven (i.e. each of the first and second portions being about one half of the dwell time in the oven).

It is contemplated that the air velocity may be increased in the second portion of the oven by any suitable means, such as by stepped incrementents, but is preferably increased at a constant and gradual rate, such as by a linear or curvilinear velocity increase. This gradual increase in air velocity allows the topcoating composition to be cured at a steadily increasing, but controlled, manner that provides improved coating properties with a minimum of flaws in surface appearance, while also allowing high film builds to be achieved in a short period of time with minimum energy input, and the flexible operating conditions that can decrease the need for spot repairs.

The process of the present invention can further comprise an additional curing step 64 in which hot air 66 is applied to the sintered topcoat after step 60 to achieve and hold a peak metal temperature ranging from about 125° C. to about 175° C. for a period of at least about 10 minutes and simultaneously cure the topcoat and the basecoat. Preferably, a combination of hot air convection treatment and infrared radiation is used simultaneously to cure the topcoat and the basecoat.

Curing step 64 can be carried out using a hot air convection dryer, such as are discussed above or in a similar manner to that of step 22 above using a combination infrared radiation/convection treatment apparatus, however the peak metal temperature of the substrate ranges from about 125° C. to about 175° C. and the substrate is maintained at the peak metal temperature for at least about 10 minutes, and preferably about 10 to about 20 minutes.

The hot air preferably has a temperature ranging from about 110° C. to about 140° C., and more preferably about 120° C. to about 135° C. The velocity of the air at the surface of the topcoating composition in curing step 64 can range from about 4 to about 20 meters per second, and preferably ranges from about 10 to about 20 meters per second.

If a combination of hot air and infrared radiation is used, the infrared radiation applied preferably includes near-infrared region (0.7 to 1.5 micrometers) and intermediate-infrared region (1.5 to 20 micrometers), and more preferably ranges from about 0.7 to about 4 micrometers. Curing step 64 can be carried out using any conventional combination infrared/convection treatment apparatus such as the BGK combined infrared radiation and heated air convection oven that is described in detail above. The individual emitters 26 can be configured as discussed above and controlled individually or in groups by a microprocessor (not shown) to provide the desired heating and infrared energy transmission rates.

It is contemplated that the above-discussed curing step 64, and the parameters in which it is employed, may also be applied as an optional curing step 25 to cure the sintered basecoat prior to application of the powder topcoat over the basecoat.

The thickness of the sintered and crosslinked composite coating is generally about 0.2 to 5 mils (5 to 125 micrometers), and preferably about 0.4 to 4 mils (10 to 100 micrometers). The powder topcoating can be cured by hot air convection treatment and, if desired, infrared heating, such that any crosslinkable components of the powder topcoating are crosslinked to such a degree that the automobile industry accepts the coating process as sufficiently complete to transport the coated automobile body without damage to the topcoat. The powder topcoating can be cured using any conventional hot air convection dryer or combination convection/infrared dryer such as are discussed above.

Another aspect of the present invention is a process for coating a polymeric substrate. The process includes steps similar to those used for coating a metal substrate above.

This process of the present invention includes applying a powder basecoating composition a surface of the polymeric substrate as described above. Suitable powder basecoating compositions and methods of applying the same are discussed in detail above for coating the metal substrate. If the powder coating is a slurried composition, the basecoating composition (or topcoating composition, if applicable) may be exposed to air having a temperature ranging from about 10° C. to about 50° C. for a period of at least about 5 minutes to volatilize at least a portion of volatile material from the slurried basecoating composition. The velocity of the air at a surface of the basecoating composition is less than about 0.5 meters per second, and preferably ranges from about 0.3 to about 0.5 meters per second. The apparatus used to volatilize the basecoat can be the same as that used to volatilize the basecoat for the metal substrate.

The process can further comprise an additional step (which can be used after the volatilization step above or in lieu thereof) of applying infrared radiation and, optionally, low velocity warm air simultaneously to the basecoating composition for a period of at least about 90 seconds, and up to about 480 seconds. The infrared radiation is applied at a power density and in a manner discussed above with respect to the metal substrate. The temperature of the polymeric substrate is increased at a rate ranging from about 0.3° C. per second to about 1.25° C. per second to achieve a peak polymeric temperature ranging from about 125° C. to about 200° C. and form a sintered basecoat upon the surface of the polymeric substrate. When air is employed simultaneously with the infrared heating, the velocity of the air at the surface of the basecoating composition ranges from about 0.25 meters per second to about 1.0 meters per second.

The apparatus used to sinter the basecoat can be the same combined infrared/hot air convection apparatus such as is discussed above for treating the metal substrate.

The basecoat can be cured, if desired, as discussed above, and/or may be cooled to a temperature of about 25° C. to about 32° C., as discussed above, before the powder topcoating is applied thereover. Suitable powder topcoating compositions and methods of applying the same are discussed in detail above for coating the metal substrate.

After applying the topcoating composition over the sintered or cured basecoat, the process of the present invention further comprises applying infrared radiation and hot air simultaneously to the topcoating composition for a period of at least about 2 minutes, and up to about 20 minutes. The infrared radiation is applied at a power density and in a manner discussed above. The temperature of the polymeric substrate is increased at a rate ranging from about 0.8° C. per second to about 1.3° C. per second to achieve a peak polymeric temperature ranging from about 125° C. to about 175° C. to form a powder layered system upon the surface of the polymeric substrate.

The velocity of the air at the surface of the topcoating composition may range from about 0.5 meters per second to up to about 13 meters per second. The air velocities and the manner in which they are applied may be the same as discussed above with respect to the treatment of the topcoat over the metal substrate. The apparatus used to treat the topcoat can be the same combined infrared/hot air convection apparatus such as is discussed above for treating the metal substrate.

The topcoat can be cured separately, or together with the powder basecoat as discussed above.

The present invention will be described further by reference to the following example. The following example is merely illustrative of the invention and is not intended to be limiting. Unless otherwise indicated, all parts are by weight.

EXAMPLE 1

In this example, steel test panels were coated with a powder basecoat and powder clearcoat as specified below to evaluate drying processes according to the present invention. The test substrates were cold rolled steel panels, commercially available from ACT Laboratories, Hillsdale, Mich., size 30.48 cm by 45.72 cm (12 inch by 18 inch) electrocoated with a cationically electrodepositable primer commercially available from PPG Industries, Inc., Pittsburgh, Pa. as ED-5000. A powder basecoat (a “reclaim blend” of PZB 8100 White, PZB 60100 Red, and PZB 53100 Blue Metallic, which are commercially available from PPG Industries, Inc.) was spray applied to three panels using two coat automated powder bell spray at 55% relative humidity and 20° C. to give a dry film thickness as specified below.

The “reclaim blend” of all three powder coating was applied first to 25 microns. Immediately thereafter, a coat of the virgin color (red, white or blue powder) was applied at 37–50 microns was separately applied over the reclaim blend layer. The layers were sintered for 4 minutes as specified in Table 1, and as described above, using a BGK combined infrared radiation and heated air convection oven, which is commercially available from BGK-ITW Automotive Group, Minneapolis, Minn. The panels were then topcoated with DJ-73 powder clearcoat, commercially available from PPG Industries, Inc., and sintered a second time with a 5 minute cycle as specified in Table 1 and as described above.

TABLE 1

PROCESS DATA

| | | | |
|---|---|---|---|
| DATA: Sintering Powder Basecoat Then Curing Powder Base and Clear Together | | | |
| SUBSTRATE: | Large speedshapes 64 × 32 cm and 12" × 18" panels | | |
| TARGET DISTANCE: | 8 inches to top surface | | |
| VOLTAGE LEVEL: | PBC = 30" @ 450 V + 1'30" @ 400 V + 1' @ 350 V + 1' @ 250 V<br>TOTAL = 4 minutes | PCC = 45" @ 450 V + 1'15" @ 400 V + 1' @ 350 V + 2' @ 250 V<br>TOTAL = 5 minutes | |
| REFLECTOR. | STAINLESS STEEL | | PBC = Powder Basecoat |
| APPLICATION: | As outlined below | | PCC = Powder Clearcoat |

APPLICATION

| | | | | |
|---|---|---|---|---|
| RECLAIM: | First Coat Powder Base | | Applied 25–28 Microns | |
| TRANSPORT AIR: 30 PSI | | | | |
| VENTURI AIR: | 18 PSI | | | |
| VOLTAGE: | 55 KV 62–65 mA | | | |
| 10" TARGET DISTANCE | | | | |
| LINE SPEED: | 14 FPM | | | |
| FILM BUILD | 25–28 MICRONS | | | |
| ITW POWDER BELL: | SHAPING AIR: 6 PSU | BEARING AIR 84 PSI | CLEANING AIR 10 PSI | BELL SPEED: 6,000 RPM |
| VIRGIN BASECOAT IS IMMEDIATELY APPLIED AS THE SECOND COAT OF BASECOAT | | | | |
| VIRGIN BASECOATS: | LINE SPEED 18 FEET PER MINUTE | | | |

| | TRANSPORT AIR | VENTURI AIR | VOLTAGE | TARGET DISTANCE | FILM BUILD | AFTER CLEAR COAT AUTOSPECT OVERALL | (ie APPEARANCE NUMBER GLOSS + DISTINCTNESS OF IMAGE + ORANGEPEEL) |
|---|---|---|---|---|---|---|---|
| RED | 20 PSI | 50 PSI | 60 KV @ 53–57 mA | 10 inches | 53 MICRONS | 62 | |
| WHITE | 10 PSI | 50 PSI | 60 KV @ 53–57 mA | 10 inches | 53 MICRONS | 58 | |
| BLUE | 15 PSI | 50 PSI | 60 KV @ 53–57 mA | 10 inches | 55 MICRONS | 65 | |
| POWDER | | | | | | | |
| CLEAR | Line speed 18 feet per minute | | | | | | |
| DJ-73 | 25 PSI | 75 PSI | 65 KV @ 50 mA | 10 inches | 85 microns | ABOVE | |

Appearance excellent on all sintered powder colors base speedshape/cured with powder clear overcoat-crater free and very good flow and gloss As shown in Example 1, and as discussed above, the processes of the present invention provide rapid coating of metal and polymeric substrates, can eliminate or reduce the need for long assembly line ovens, and can drastically reduce overall processing time. Good flow and appearance of the powder coating compositions, particularly for basecoat and topcoat applications, even at higher thicknesses, provides more operating latitude when applying the coatings, which can lower repairs. In addition, embodiments of the present invention substantially reduce the powder slurry dehydration times (when applicable) and peak metal temperatures while maintaining good coating properties to the coated substrate.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

Therefore, I claim:

1. A process for coating a metal substrate, comprising the steps of:

(a) applying a first powder coating composition to a surface of the metal substrate;

(b) applying a first infrared radiation at a first power density of 30 kilowatts per meter squared or less and optionally a first air simultaneously to the first coating composition for a first period of at least or about 90 seconds, a first temperature of the metal substrate being increased at a first rate ranging from about 0.3° C. per second to about 1.25° C. per second to achieve a first peak metal temperature ranging from about 125° C. to about 200° C., such that a sintered first coating is formed upon the surface of the metal substrate;

(c) applying a second powder coating composition over the first powder coating; and (d) applying a second infrared radiation at a second power density of 30 kilowatts per meter squared or less and a second air simultaneously to the second coating composition for a second period of at least or about 2 minutes, a second temperature of the metal substrate being increased at a second rate ranging from about 0.8° C. per second to about 1.3° C. per second to achieve a second peak metal temperature of the substrate ranging from about 125° C. to about 175° C., such that a powder layered system is formed upon the surface of the metal substrate.

2. The process according to claim 1, wherein the metal substrate is selected from the group consisting of iron, steel, aluminum, zinc, magnesium, alloys and combinations thereof.

3. The process according to claim 1, wherein the metal substrate is an automotive body component.

4. The process accordingly to claim 1, wherein the first coating composition is a basecoating composition, and the second coating composition is a topcoating composition.

5. The process according to claim 1, wherein the first air is applied to the first coating composition simultaneously with the first infrared radiation in the step (b).

6. The process according to claim 5, wherein the first air has a first air temperature ranging from about 65° C. to about 140° C. in the step (b).

7. The process according to claim 5, wherein the first air is applied at a first velocity ranging from about 0.25 meters per second to about 1.0 meter per second in the step (b).

8. The process according to claim 1, wherein the first period ranges from about 90 seconds to about 480 seconds in the step (b).

9. The process according to claim 1, wherein the first infrared radiation is emitted at the first power density ranging from about 4.5 kilowatts per square meter to about 14 kilowatts per square meter in the step (b).

10. The process according to claim 1, wherein the first infrared radiation and the second infrared radiation is emitted at a wavelength ranging from about 0.7 micrometers to about 20 micrometers in both the steps (b) and (d), respectively.

11. The process according to claim 10, wherein the first infrared radiation and the second infrared radiation is emitted at the wavelength ranging from about 0.7 micrometers to about 4 micrometers in both the steps (b) and (d), respectively.

12. The process according to claim 1, wherein the second power density of the second infrared radiation ranges from about 4.5 kilowatts about 14 kilowatts per square meter in the step (d).

13. The process according to claim 1, wherein the second air in the step (d) has a second air temperature ranging from about 90° C. to about 200° C.

14. The process according to claim 13, wherein the second air in the step (d) has the second air temperature ranging from about 120° C. to about 150° C.

15. The process according to claim 1, wherein the second air has a second air velocity ranging from about 0.5 meters per second to about 13 meters per second per second in the step (d).

16. The process of claim 15, wherein the second air velocity is about 0.5 meters per second during a first portion of the second period, and the second air velocity is increased to up to about 13 meters per second during a second portion of the second period in the step (d).

17. The process of claim 16, wherein a first dwell time in the first portion of the second period and a second dwell time in the second portion of the second period are approximately equal in the step (d).

18. The process of claim 16, wherein the second air velocity is increased to up to about 13 meters per second during the second portion of the second period at a curvilinear rate.

19. The process according to claim 1, wherein the second air is applied to the second coating composition at a second air velocity ranging from about 0.5 to about 3 meters per second in the step (d).

20. The process according to claim 1, wherein the second period ranges from about 2 minutes to about 20 minutes in the step (d).

21. The process according to claim 1, further comprising an additional step (b') of applying hot air having a temperature ranging from about 110° C. to about 140° C. to the sintered first coating to achieve a peak metal temperature ranging from about 125° C. to about 175° C. for a period of at least or about 10 minutes after step (b), such that a cured first coat is formed upon the surface of the metal substrate.

22. The process according to claim 21, wherein additional step (b') further comprises applying infrared radiation to the first coating simultaneously while applying the hot air.

23. The process according to claim 1, further comprising an additional step (b") of cooling the metal substrate to a temperature ranging from about 25° C. to about 32° C. between the steps (b) and (c) prior to applying the second powder coating composition.

24. The process according to claim 1, further comprising an additional step (e) of curing the second powder coating composition after application over the first coating.

25. The process according to claim 24, wherein the additional step (e) further comprises curing the first coating composition and the second powder coating composition after application of the second powder coating composition over the first coating.

26. A process for coating a substrate, comprising the steps of:

(a) applying a first powder coating composition to a surface of the substrate;

(b) applying a first infrared radiation at a first power density of 30 kilowatts per meter squared or less and optionally a first air simultaneously to the first coating composition for a first period of at least or about 90 seconds such that a sintered first coating is formed upon the surface of the substrate;

(c) applying a second powder coating composition over the first coating; and (d) applying a second infrared radiation at a second power density of 30 kilowatts per meter squared or less and a second air at a second air velocity ranging from about 0.5 to about 13 meters per second simultaneously to the second coating composition for a second period of at least or about 2 minutes, such that a powder layered system is formed upon the surface of the substrate.

27. The process accordingly to claim 1, wherein the first coating composition is a basecoating composition, and the second coating composition is a topcoating composition.

28. The process according to claim 26, wherein the first air is applied at a first velocity ranging from about 0.25 meters per second to about 1.0 meter per second in the step (b).

29. The process according to claim 26, wherein the second air velocity ranges from about 0.5 to about 3 meters per second in the step (d).

30. The process of claim 26, wherein the second air velocity is about 0.5 meters per second during a first portion of the second period, and the second air velocity is increased to up to about 13 meters per second during a second portion of the second period in the step (d).

31. The process of claim 30, wherein a first dwell time in the first portion of the second period and a second dwell time in the second portion of the second period are approximately equal in the step (d).

32. The process of claim 30, wherein the second air velocity is increased to up to about 13 meters per second during the second portion of the second period at a curvilinear rate in the step (d).

33. The process according to claim 26 wherein the second period ranges from about 2 minutes to about 20 minutes in the step (d).

34. A process for coating a polymeric substrate, comprising the steps of:

(a) applying a first powder coating composition to a surface of the polymeric substrate;

(b) applying a first infrared radiation at a power density of 30 kilowatts per meter squared or less and optionally a first air simultaneously to the first coating composition for a first period of at least or about 90 seconds, a first temperature of the polymeric substrate being increased at a first rate ranging from about 0.3° C. per second to about 1.25° C. per second to achieve a first peak polymeric temperature ranging from about 125° C. to about 200° C., such that a sintered first coating is formed upon the surface of the polymeric substrate;

(c) applying a second powder coating composition over the first coating; and (d) applying a second infrared radiation and a second air simultaneously to the second coating composition for a second period of at least or about 2 minutes, a second temperature of the polymeric substrate being increased at a second rate ranging from about 0.8° C. per second to about 1.3° C. per second to achieve a second peak polymeric temperature of the substrate ranging from about 90° C. to about 175° C., such that a powder layered system is formed upon the surface of the polymeric substrate.

35. The process accordingly to claim 34, wherein the first coating composition is a basecoating composition, and the second coating composition is a topcoating composition.

36. The process according to claim 34, wherein the first air is applied at a first velocity ranging from about 0.25 meters per second to about 1.0 meters per second in the step (b).

37. The process of claim 34, wherein the second air has a second air velocity of about 0.5 meters per second during a first portion of the second period, and the second air velocity is increased to up to about 13 meters per second during a second portion of the second period in the step (d).

38. The process according to claim 34, wherein the second air is applied to the second coating composition at a second air velocity ranging from about 0.5 to about 3 meters per second in the step (d).

39. The process according to claim 34, further comprising an additional step (b') of cooling the polymeric substrate having the first coating thereon to a temperature of about 25° C. to about 32° C. between steps (b) and (c).

40. The process according to claim 34, wherein the second period ranges from about 2 minutes to about 20 minutes in the step (d).

* * * * *